J. V. PUGH.
WHEEL FOR MOTOR VEHICLES.
APPLICATION FILED AUG. 10, 1907.
903,608.
Patented Nov. 10, 1908.
2 SHEETS—SHEET 1.
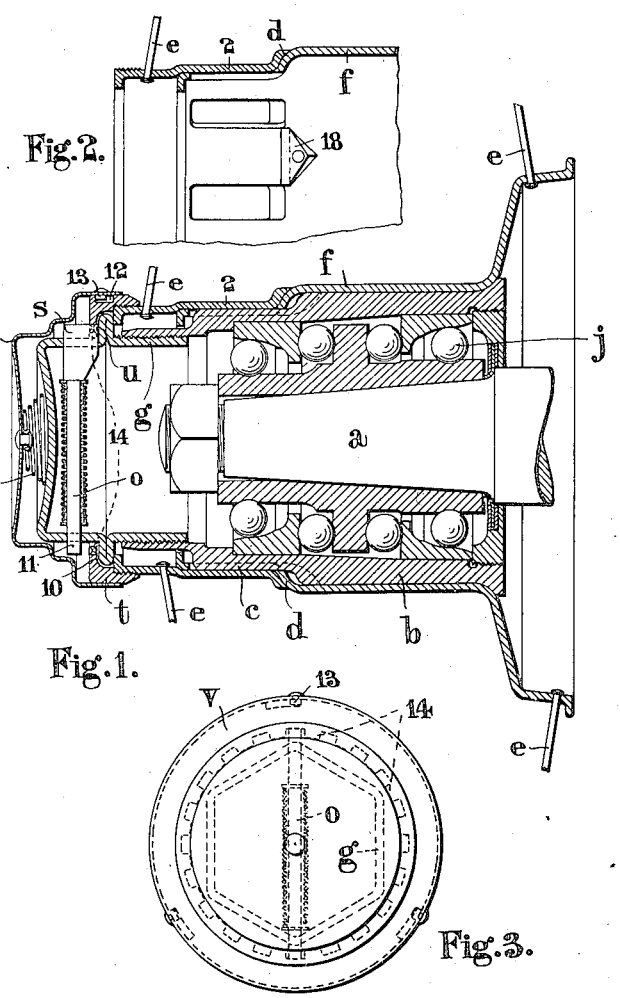
WITNESSES:
W. M. Avery
J. P. Davis
INVENTOR
John Vernon Pugh
BY
Munn & Co.
ATTORNEYS

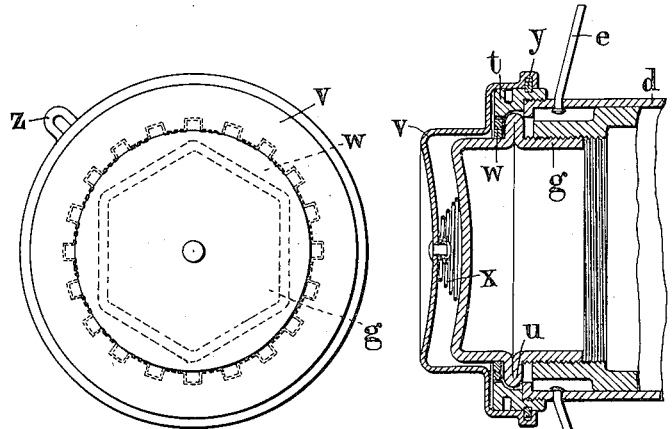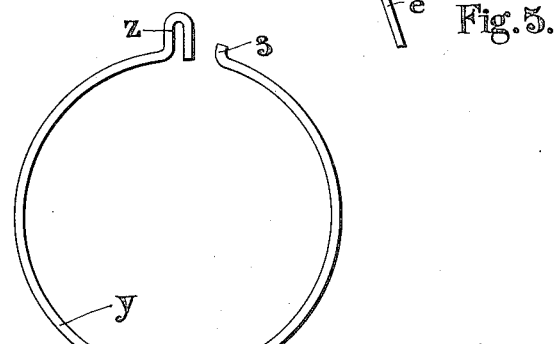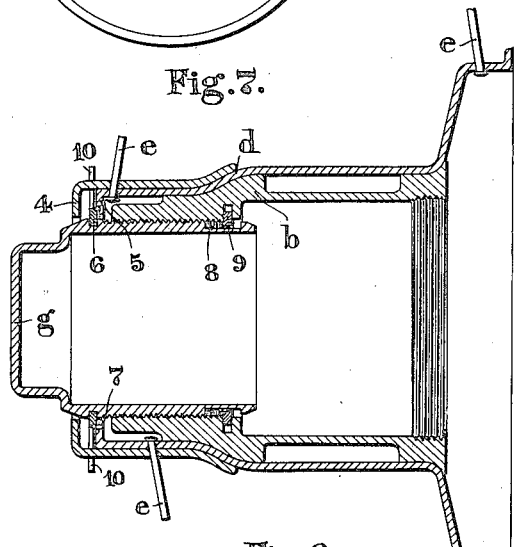

UNITED STATES PATENT OFFICE.

JOHN VERNON PUGH, OF ALLESLEY, ENGLAND.

WHEEL FOR MOTOR-VEHICLES.

No. 903,608.　　　Specification of Letters Patent.　　　Patented Nov. 10, 1908.

Application filed August 10, 1907. Serial No. 388,013.

*To all whom it may concern:*

Be it known that I, JOHN VERNON PUGH, a subject of the King of Great Britain and Ireland, of Guiting House, Allesley, in the county of Warwick, England, engineer, have invented certain new and useful Improvements in Wheels for Motor-Vehicles, of which the following is a specification.

This invention relates to the wheels of road vehicles, and its object is to provide a reliable and readily detachable wheel.

The invention consists in a wheel composed of a permanent wheel hub, a removable hub enveloping said permanent hub and carrying the spokes and felly clutch members between and formed integral with said hubs.

The invention further comprises (*a*) an internally-arranged locking device for insuring that the removable wheel part will not come out of place, said locking device being of such a character that the wheel parts will not assemble unless the locking device is in proper operative position; (*b*) means for rendering the withdrawal of the wheel easier. Thus the two hubs are held in place through the agency of a screwed member, which, when turned in one direction, tightens the removable hub upon the permanent hub, and when turned in the other direction, starts the withdrawal. The engaging member for the withdrawal is herein shown as either an oppositely screwed member or a split ring.

Referring now to the accompanying drawings—Figure 1 is a sectional elevation through a wheel hub constructed in accordance with this invention; Fig. 2 is a detail view showing the pilot or finding pieces which I employ for guiding the engaging members into place; Fig. 3 is an end view of the wheel hub, while Fig. 4 is a detached view showing the permanent hub and the flutes or clutch members formed thereon; Figs. 5, 6, and 7 show a modified form of locking member and fixing for the cover; Fig. 8 shows a modified arrangement of the wheel in section.

In Fig. 1, the axle *a* has passed over it a permanent hub *b*, while ball-bearings *j*, in the case of front wheels, are placed between the axle *a* and the hub *b*. In the case of driving wheels, however, the permanent hub *b* may be keyed or otherwise attached to the axle *a*. The permanent hub is shown as composed of a shell *b* (Fig. 4) having flutes or projections *c* formed at intervals around it. These flutes engage circumferentially, and allow of free withdrawal axially; there is thus no jamming created during driving. Over the permanent hub *b* there is passed a removable hub *d*, fitting easily on the permanent hub and by preference having an ample bearing thereon, as shown. This removable hub carries the spokes *e*, which are attached to the tire carrying rim or felly (not shown). The removable hub *d* is shown as built up of the shells 2 and *f*, which overlap, the shell *f* being arranged within the shell 2. The shell *f* is cut away at intervals corresponding to the intervals at which the flutes *c* are placed, so that, when the removable hub *d* is passed over the permanent hub *b*, the flutes *c* fit into the clefts or cut-away parts on the shell *f*. In this way the two hubs are coupled together at a number of points around the circumference of the hubs and a good driving connection provided between them. For the purpose of enabling the proper circumferential position of the wheel to be found where the clefts are opposite the flutes *e*, I provide a number of V-shaped pilot pieces 18, placed in advance of the clefts. The ends of the flutes are pointed, as shown. By this means I have found that when the removable wheel has been placed on the hub, a simple push suffices to get it into proper place. By making the bearing continuous, as shown, the removable wheel is steadied and held central while the engaging members are entering their clefts. Instead of fixing separate pilot pieces 18, as shown in Fig. 2, I may make a suitable indentation or impression in the shell, or other suitable finding means may be used in those cases where speed is required in getting the wheels in place. The shell 2 is turned down at its outer end, and against this turned-down part there bears a shoulder *u* formed on a cap nut *g* engaging an internal thread on the permanent hub. Over the shoulder *u*, and engaging with the removable hub *d*, there is a nut or screwed ring *t*. The cap nut *g* is screwed with a right-hand thread, while the ring *t* is screwed with a left-hand thread.

The overhanging flange 10 of the screwed ring *t* is provided with a number of castellations 14, as seen in dotted lines in Fig. 3. Into these castellations there fits the end *s* of a spring-pressed bar *o*, which is provided with an extended tail piece 11 projecting through the nut $g$. Over the whole of these parts there passes a light cover $v$, pressed outward by a spring $x$ and retained in place by means of a bayonet joint, composed of a pin 13 working in the usual form of bayonet joint, groove 12, in the screwed ring $t$. Instead of the pin being on the cover $v$ and the groove on the nut $t$, the positions may be reversed. According to this construction, it will be seen that the locking means are inclosed and out of the region of all harm, and the cover $v$ cannot be inserted in place until the locking part $s$ of the spring bar $o$ is nested in one of the castellations of the screwed ring $t$. This is because the extension 11 then projects outside the nut, and the over-all length of the bar $o$ just fits into the dished portion of the cover. On removal, the cover $v$ is first taken off, then a spanner is applied to the nut $g$, the act of applying the spanner being arranged to press the spring-lock $s$ out of engagement with the castellations 14 in the ring $t$. The unscrewing of the nut $g$ causes the ring $t$ to jam against the shoulder $u$ on the nut $g$, and thereby the withdrawal of the removable wheel is started while the permanent hub still remains in place.

In the modification shown in Figs. 5 and 6, instead of employing a spring bar $o$, a star washer or Vernier washer $w$ is employed. This consists of a plate $w$, pierced to fit the exterior of the hexagon on the screwed cap nut $g$, and the outer edge of the plate $w$ is provided with castellations fitting loosely in the recesses found on the overlapping flange of the nut $t$. The cover $v$ in this case is held by a split ring $y$, adapted to fit into a groove formed in the ring $t$. The split ring is provided with two turned-up portions 3 and $z$ (see Fig. 6). The portion 3 fits into a recess formed in the annulus in the cover to receive it, while the portion $z$ projects up through a hole formed in the annulus on the cover, so as to offer a proper gripping means for expanding the split ring $y$, which, when expanded, clears the groove in the ring $t$ and permits of the withdrawal of the cover $v$. When the parts are all properly assembled, the dished cover $v$ bears against the washer $w$ so as to hold that washer in place, and, in fact, unless the washer $w$ is properly in place, the cover $v$ cannot be fixed, as will be readily seen from examining the figures. The ring $t$ and nut $g$ are screwed with oppositely-handed threads, as in the form described with reference to Figs. 1-4, and for the same purpose.

According to the form of the invention shown in Fig. 8, split piston rings are employed for effecting the connection between the removable hub and the permanent hub. The overlapping parts of the hub $d$ are extended to the removal or outer side of the wheel, as shown, and are provided with flanges 4, 5, forming an annulus for a split spring ring 6. The flange 5 is provided with a groove or inset 7, in which the ring 6 finds a seating when the wheel is screwed up into position. The split ring 6 also rests in a groove in the nut $g$, which in this form is rather longer, and at its inner end is provided with a wide groove 8, in which a split ring, 9, finds a seating. This split ring prevents the nut $g$ from coming entirely out of place. The split ring 9, however, is not a necessity. It will be seen that the space in which the split ring 6 is situated is arranged with a step, so that when the nut $g$ is tightened up into position, it is impossible for the ring 6 to expand, and, consequently, the hub cannot become accidentally detached.

The operation of this device is as follows: Assume the detachable wheel to be already fixed on the hub, then, to remove it, first unscrew the nut $g$, so as to carry the split ring 6 away from engagement with the step 7 into the deeper space between the flanges 4 and 5; unscrew a little further, until the ring 6 bears against the hub 4, thereby starting the removal of the wheel and getting a split ring, 9, finds a seating. This split ring ring may now be expanded by pulling a projection 10, similar to the turn-up $z$ described with reference to Fig. 6, and the wheel may then be readily withdrawn. To put the wheel on again, it is only necessary to push it over the hub until the ring 6 springs into place in its groove on the nut $g$, then, by tightening the nut $g$, the wheel is once more held securely up into its proper position, so that the ring 6 cannot expand. This form of attaching device is exceedingly speedy, and enables repairs or renewals to be effected with a minimum of delay.

In some cases the groove for the split ring 6 may be formed in the permanent hub $b$, but this necessitates very accurate workmanship, in consequence of which I usually prefer to provide the groove in the nut $g$.

Having now described my invention, what I claim as new and desire to secure by Letters Patent is:

1. A wheel for motor vehicles comprising a permanent hub part, a removable hub part enveloping said permanent hub part and carrying the spokes and felly, clutch members between and formed integral with said hubs, a holding nut and locking means carried by and inclosed within said nut.

2. A wheel for motor vehicles comprising a permanent hub part, a removable hub part enveloping said permanent hub part, clutch members between and formed integral with said hubs, a screw cap nut and inclosed locking means for holding and retaining said hubs in working position, and a releasing element on said inclosed locking means projecting through the locking nut.

3. A wheel for motor vehicles comprising a permanent hub part, a removable hub part enveloping said permanent hub part and carrying the spokes and felly, clutch members between and formed integral with said hubs, and means for positively withdrawing the removable from the permanent hub part.

4. A wheel for motor vehicles comprising a permanent hub part, a removable hub part enveloping said permanent hub part and carrying the spokes and felly, clutch members between and formed integral with said hubs, a screw cap nut for holding said hubs in operative position, and means operated by said nut for positively withdrawing the removable wheel part.

5. A wheel for motor vehicles comprising a permanent hub part, a removable hub part enveloping said permanent hub and carrying the spokes and felly, clutch members between said hubs, a cap nut holding said hubs in position, and inclosed locking means for retaining said detachable hub upon said permanent hub.

6. A wheel for motor vehicles comprising a permanent hub part, a removable hub part enveloping said permanent hub and carrying the spokes and felly, and means for positively withdrawing said removable from said permanent hub.

7. A wheel for motor vehicles comprising a permanent hub part, a removable hub part enveloping said permanent hub and carrying the spokes and felly, a screw nut holding said parts in working position, and means for positively withdrawing the removable hub from the permanent hub.

8. A wheel for motor vehicles comprising a permanent hub part, a removable hub part enveloping said permanent hub and carrying the spokes and felly, clutch members between said removable and said permanent hub, a screw nut holding said parts in working position, and means for positively withdrawing said removable from said permanent hub.

9. A wheel for motor vehicles comprising a permanent hub part, a removable hub part enveloping said permanent hub, circumferentially engaging clutch members between said hubs, and means for positively withdrawing said removable from said permanent hub by relative axial displacement.

10. A wheel for motor vehicles comprising a permanent hub part, a removable hub part composed of overlapping shells with a plurality of clefts on the inner shell, and a plurality of flutes on the permanent hub engaging in the clefts on the shell.

11. A wheel for motor vehicles comprising a permanent hub part, a removable hub part composed of overlapping shells with a plurality of clefts on the inner shell, a plurality of flutes on the permanent hub engaging in the clefts on the shell, and a screw cap nut retaining said parts in working relationship.

12. A wheel for motor vehicles comprising a permanent hub part, a removable hub part enveloping said permanent hub, clutch members between said permanent and removable hubs, a screwed nut holding said hubs in engaging position, and an oppositely screwed ring co-acting with said screwed nut for the removal of the wheel.

13. A wheel for motor vehicles comprising a permanent hub part, a removable hub part, clutch members between said parts, a screwed nut gearing with said permanent hub and having a shoulder bearing on said removable hub, and an oppositely screwed ring gearing with said removable hub and co-acting with the shoulder on said nut for the removal of the wheel.

14. A wheel for motor vehicles comprising a permanent hub part, a removable hub part, clutch members between said parts, a screw cap gearing with said permanent hub and bearing against said removable hub, a spring-pressed locking bar carried by said screwed cap, and a co-acting socketed member with which said spring bar engages, substantially as described.

15. A wheel for motor vehicles comprising a permanent hub part, a removable hub part, a screwed cap holding said parts in proper relative position, locking means carried by said screwed cap and an external protecting cover over said cap and locking means, substantially as described.

16. A wheel for motor vehicles comprising a permanent hub part, a removable hub part, a screwed cap holding said parts in proper relative position, an oppositely screwed ring with a castellated flange, a spring-pressed bar carried by said screwed cap and adapted to engage with the castellations for the purpose of locking the screw cap.

17. In combination with a detachable wheel, a protecting cover for the hub retaining means with an annular groove formed therein, a split ring in said groove adapted to engage in a groove on the hub retaining means only when these are properly locked and assembled in position.

18. A wheel for motor vehicles comprising a permanent hub part, a removable hub part composed of partly overlapping shells with clefts formed in the inner shell, projections on the permanent hub engaging said clefts, a screwed cap gearing with said permanent hub and having a shoulder bearing against said removable hub, an oppositely screwed castellated ring engaging said removable hub, a spring-pressed locking bar carried by said screwed cap and engaging in the castellations in said oppositely screwed ring, a protecting cover adapted to pass into place only when said spring-pressed bar is properly housed between the castellations.

19. A removable wheel for motor vehicles comprising a permanent hub part (*b*) carrying clutch members *c*, a removable hub part composed of overlapping shells (2 and *f*) engaging with said clutch members, a screwed cap nut *g* having a shoulder *u* formed thereon, an oppositely screwed ring (*t*) gearing with a screw on the removable hub and having a castellated flange overlapping said shoulder *u*, a spring-pressed locking bar extending through the screwed cap and arranged to engage in castellations on ring *t*, and an outer protecting cover, substantially as described.

20. A removable wheel for motor vehicles comprising a permanent hub part, a removable hub part, clutch members between said parts, and finding means for piloting said clutch members into position on inserting the removable wheel in place.

21. A removable wheel for motor vehicles comprising a permanent hub part, a removable hub part, equidistant flutes on said permanent hub engaging in equidistant recesses or clefts in said removable hub, and V-shaped pilot-pieces for facilitating the insertion of said wheel, substantially as described.

In testimony whereof I have signed my name to this specification in the presence of two subscribing witnesses.

JOHN VERNON PUGH.

Witnesses:
ERNEST HARKER,
KATHLEEN THOMPSON.